United States Patent Office 3,842,092
Patented Oct. 15, 1974

3,842,092
SESQUICILLIN
Berthold Thiele, Hirschthal, and Hans Tscherter, Neuall-schwil, Switzerland, assignors to Sandoz Ltd., Basel, Switzerland
No Drawing. Filed Mar. 30, 1973, Ser. No. 346,586
Claims priority, application Switzerland, Apr. 5, 1972, 4,954/72; Nov. 8, 1972, 16,250/72
Int. Cl. C07d 7/06
U.S. Cl. 260—343.5                                          1 Claim

ABSTRACT OF THE DISCLOSURE

The invention relates to a novel metabolite, called sesquicillin, which is 3-[5β,8aβ-dimethyl-6-acetoxy-2-methylene - 5 - (4-methyl-3-pentenyl)-1β,2,3,4,4aα,5,6α,7,8,8a-decahydro - 1 - naphthylmethyl]-5,6-dimethyl-4-hydroxy-2H-pyran-2-one of the formula,

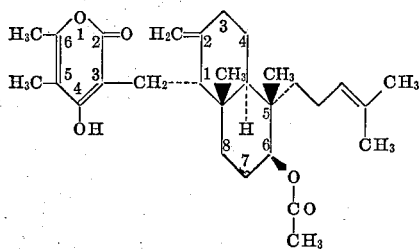

useful as an antihypertensive, antiphlogistic, bronchospasmolytic and laxative agent.

The present invention relates to a new metabolite, hereinafter called sesquicillin, and processes for the production thereof.

In accordance with the invention there is provided the new metabolite sesquicillin which is 3-[5β,8aβ-dimethyl-6-acetoxy - 2 - methylene - 5-(4-methyl-3-pentenyl)-1β,2,3, 4,4aα,5,6α,7,8,8a - decahydro - 1-naphthylmethyl]-5,6-dimethyl-4-hydroxy-2H-pyran-2-one of formula I.

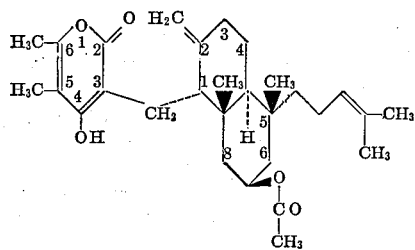

Further, in accordance with the invention sesquicillin may be obtained by a process comprising cultivating a sesquicillin-producing strain of the fungus species Sesquicillium globulisporum nov. spec. in contact with a nutrient medium, until a sufficient amount of sesquicillin has been produced. The sesquicillin may be isolated from the fermentation liquor, which may be conveniently disintegrated with an Ultra-turrax apparatus, by known methods such as extraction or adsorption, and subsequent purification chromatographically by crystallization or countercurrent distribution.

The preferred strain of Sesquicillium globulisporum nov. spec. employed in the process of the invention was isolated from a soil sample found at Rovinj, Yugoslavia, and a specimen of the strain has been deposited with the United States Department of Agriculture (Northern Utilization Research and Development Division) Peoria, Ill., U.S.A., under the reference NRRL 5433 (hereafter called strain NRRL 5433).

Alternatively sesquicillin-producing mutants or variants of the strain NRRL 5433 produced, for example, in conventional manner may be employed.

The strain NRRL 5433 grows relatively slowly and on malt agar forms a compact, pulvinate thallus having a diameter of 3–4 cm., within 10 days at the optimum temperature of from 21 to 27° C. Its hyphae only penetrate the culture medium slightly; seen from below the culture has a slightly yellowish appearance. The growth optimum is at 21–27° C., is therefore relatively broad, the minimum is at 6° C., the maximum at 36° C. The thallus consists of compactly interwoven, very much ramified, septate hyphae, the side branches often bend over in radial direction. The thickness of the hyphae is 3µ in the primary (mostly straight) and the radial supporting hyphae, 0.8–1.5µ in the primary and secondary branch hyphae. The conidia form, which is formed very sparsely at temperatures below 20° C., macroscopically has the appearance of compact cushions of manifoldly dichotomously or verticillately branched systems of phialide-bearing hyphae with 1.2–1.5µ thick and 4–7µ long cells. The phialides sprout laterally from the hyphae cells or stand at the ends; in the cushions they are compactly packed at various heights, more or less pointing upwards. They are dimorphous. The terminal phialides are telephialides (Gams 1968), often have a vesiculous swelling at the base, are 4–7µ long and 1.5–2µ thick, and extend in the form of a fine, often somewhat crooked beak. The intercalary phialides which do not occur regularly are pleurophialides (Gams 1968), are more or less cylindrical and only extend in the form of a fine beak laterally at the top. The more or less distinctly spherical, hyaline, smooth-walled conidia measure 1–1.5µ. Within the carrier cushions they are arranged as false (i.e. unconnected) chains, and on individual phialides they soon form small, disintegrating drops.

In a manner analogous to the three other hitherto known species of the genus Sesquicillium Gams, Sesquicillium globulisporum nov. spec. shows phialides often superimposed in pairs, but these pairs do not occur regularly always. Sometimes the terminal phialides also stand on two, rarely even on three intercalary phialides. The three species described by Gams and Veenbaas-Rijks all have larger and ellipsoidal conidia. The remaining characteristics, especially the structures of the carriers are also variable in these species.

[Literature: K. W. Gams in Acta bot. neerl. 17, pages 455 and 457 (1968); Veenbaas-Rijks in Acta bot. neerl. 19 (3), page 323 (1970).]

The strain NRRL 5433 may be cultivated on various nutrient media containing the usual nutrients for fungi. For example, nutrients usually employed for carbon heterotrophic microorganisms may be used, e.g. glucose and sucrose may be used as the carbon source, organic nitrogen-containing compounds such as peptone, yeast extract, amino acids and ammonium oxalate may be used as the nitrogen source, as well as the usual mineral salts and trace elements.

Sesquicillin may be produced by inoculating a liquid nutrient medium with a mycelium/spore suspension of the strain NRRL 5433, and incubating the culture at 18–33° C., preferably at 27° C., at a pH value of 4.8–5.2, for 3 to 10, preferably 4 days. The cultivation may be effected under aerobic conditions, by surface culture fermentation, by submerged culture fermentation with shaking, or in fermenters provided with devices for introducing air or oxygen and agitators.

As soon as a sufficient amount of sesquicillin has been produced, the culture solution may be conveniently disintegrated in an Ultraturrax apparatus and sesquicillin may be isolated in known manner by extraction or adsorption. Sesquicillin may then be purified by chromatography, crystallization or countercurrent distribution.

One convenient method of isolating sesquicillin comprises the extraction of the disintegrated culture solution with ethylene chloride, but other organic solvents, e.g. benzene, chloroform, butyl acetate, methylene chloride, butanol or ethyl acetate, may likewise be used.

The extracts are subsequently freed from the solvent, e.g. by distillation, the residue is defatted and sesquicillin is purified chromatographically on adsorbing agents such as Sephadex LH 20, alumina, silica gel, magnesium silicate and aluminium oxide, by countercurrent distribution and/or by crystallization.

The strain NRRL 5433 is already available to the public from the above-mentioned U.S. Department of Agriculture depository and will continue to be available throughout the effective life of any patent issuing hereon. Any restrictions on the availability of the strain NRRL 5433 to the public have already been irrevocably removed.

Sesquicillin is useful because it possesses pharmacological activity in animals. In particular, the sesquicillin is useful as an antihypertensive agent, as indicated by standard tests, for example, the hypertonic Grollman rat test on p.o. administration of 20 to 30 mg./kg. animal body weight, of the compound.

For the above mentioned use the dosage will, of course, vary depending on the mode of administration and therapy desired. However, in general, satisfactory results are obtained when administered at a daily dosage of from 10 mg. to about 30 mg. per kg. animal body weight, conveniently given in divided doses 2 to 4 times a day or in sustained release form. For the larger mammal, the total daily dosage is in the range from about 500 to about 800 mg., and dosage forms suitable for oral administration comprise from about 125 mg. to about 400 mg. of the compounds admixed with a solid or liquid pharmaceutical carrier or diluent.

Sesquicillin is furthermore useful as a bronchospasmolytic agent, as indicated by standard tests, for example by a vagally-induced bronchospasm in guinea pigs on i.v. administration of 0.05 to 0.5 mg./kg. animal body weight, of the compound and a histamine-conditioned bronchrospasm on i.v. administration of 0.1 to 0.5 mg./kg. animal body weight of the compound in guinea pigs and of 0.5 to 1.0 mg./kg. animal body weight of the compound in cats, and as further indicated by the histamine spray test in guinea pigs on p.o. administration of from 3 to 10 mg./kg. animal body weight of the compound.

For this use, the dosage will, of course, vary depending on the mode of administration and treatment desired. However, in general, satisfactory results are obtained when administered at a daily dosage of from about 0.01 mg. to about 10 mg. per kg. animal body weight, conveniently given in divided doses 2 to 4 times a day or in sustained release form. For the larger mammals, the total daily dosage is in the range from about 0.5 to about 10 mg., and dosage forms suitable for oral administration comprise from about 0.2 mg. to about 5 mg. of the compound admixed with a solid or liquid pharmaceutical carrier or diluent.

Sesquicillin is furthermore useful as an antiphlogistic agent for inhibiting exudate from inflammations and edemas, as indicated by standard tests, for example the Carregeen paw edema test and the granuloma cyst test in rats on p.o. administration of 1 to 35 mg./kg. animal body weight, of the compound.

For this use the dosage will, of course, vary depending on the mode of administration and treatment desired. However, in general, satisfactory results are obtained when administered at a daily dosage of from about 1 mg. to about 35 mg. per kg. animal body weight, conveniently given in divided doses 2 to 4 times a day or in sustained release form. For the larger mammals, the total daily dosage is in the range from about 70 to about 800 mg., and dosage forms suitable for oral administration comprise from about 18 mg. to about 400 mg. of the compound admixed with a solid or liquid pharmaceutical carrier or diluent.

Sesquicillin is furthermore useful as a laxative agent for promoting purgation in animals, as indicated by standard tests in mice, rats, guinea pigs and Rhesus monkeys on p.o. administration of 2 to 20 mg./kg. animal body weight, of the compound.

For this use the dosage will, of course, vary depending on the mode of administration and treatment desired. However, in general, satisfactory results are obtained when administered at a daily dosage of from about 0.1 mg. to about 20 mg. per kg. animal body weight, conveniently given in divided doses 2 to 4 times a day or in sustained release form. For the larger mammals, the total daily dosage is in the range from about 5 to about 50 mg., and dosage forms suitable for oral administration comprise from about 1.3 mg. to about 25 mg. of the compound admixed with a solid or liquid pharmaceutical carrier or diluent.

Sesquicillin may be used as medicament on its own, either in pure, crystalline form or as a pharmaceutically acceptable crude concentrate.

A pharmaceutical composition may comprise sesquicillin in association with a pharmaceutical carrier or diluent. Such compositions may be prepared by conventional techniques to be in the form of, for example, capsules, tablets, suppositories, suspensions or solutions, for eternal or parenteral administration. Aside from the usual pharmaceutical diluents or carriers, e.g. water, alcohols, natural or hardened oils and waxes, these pharmaceutical compositions may contain suitable preserving, stabilizing, wetting, solubilizing, sweetening, flavouring or colouring agents.

In the following non-limitative example, all temperatures are indicated in degrees centigrade.

EXAMPLE 10 litres of a nutrient solution (of which each litre contains 100 g. of sucrose
4 g. of glycine
1 g. of $KH_2PO_4$
1 g. of $MgSO_4 \cdot 7H_2O$
1 g. of yeast extract and demineralized water to make up one litre)

are inoculated in a fermenter with one litre of an intermediate culture of the strain NRRL 5433, and incubation is effected at 27° for 4 days at a pH value of 5.0, while aerating (0.5–1.0 litres of air per minute per litre of nutrient solution) and stirring (150–400 revolutions per minute).

The culture liquid is disintegrated with an Ultraturrax apparatus and extracted thrice with 10 litres of ethylene chloride. The extracts are dried over sodium sulphate and the solvent is removed in a vacuum. The residue is defatted by extraction with hexane, is chromatographed in ethanol on Sephadex LH 20 and the fraction residues are filtered in chloroform through an aluminium oxide layer (activity II).

Sesquicillin is crystallized from the filtrate residue with diethyl ether. Sesquicillin has the following characteristics:

A colourless, crystalline material having a M.P. of 168°.
Specific rotation: $[\alpha]_D^{20} = -11°$ (c. = 0.9 in chloroform).
Elementary analysis.—Found: C, 74.2; H, 9.1; O 17.4%; $C_{29}H_{42}O_5$ (470.7). Calculated: C, 74.1; H, 8.9; O, 17.0%.

The intermediate culture, used as starting material, is obtained as follows:

A nutrient medium (of which each litre contains 20 g. of glucose
  2 g. of peptone
  2 g. of malt extract
  2 g. of yeast extract
  2 g. of $KH_2PO_4$
  2 g. of $MgSO_4 \cdot 7\,H_2O$
15 g. of agar and demineralized water to make up one litre)

is inoculated with the strain NRRL 5433 and incubated at 21° for at least 10 days. The mycelium carpet grown on this nutrient medium is suspended in a physiological common salt solution. One litre of a nutrient solution of a preculture (of which each litre contains 100 g. of sucrose
  3 g. of ammonium oxalate
10 g. of Proflo
  1 g. of $Ca(NO_3)_2 \cdot 4H_2O$
250 mg. of $MgSO_4 \cdot 7H_2O$
250 mg. of $KH_2PO_4$
125 mg. of KCl
16.6 mg. of $FeSO_4 \cdot 7H_2O$
6.9 mg. of $ZnSO_4 \cdot 7H_2O$
10 mcl. of $H_2SO_4$ (95–97%) and demineralized water to make up one litre)

is inoculated with the mycelium/spore suspension obtained above and incubation is effected at 24° for 2 days with shaking.

One litre of a nutrient solution of an intermediate culture having the same composition as the preculture is inoculated with 100 ml. of the above suspension and incubation is effected at 27° for 2 days with stirring.

What is claimed is:
1. Sesquicillin, which is 3-[5β, 8aβ-dimethyl-6-acetoxy-2-methylene - 5 - (4-methyl - 3 - pentenyl)-1β,2,3,4,4aα,5,6α,7,8,8a - decahydro - 1 - naphthylmethyl]-5,6-dimethyl-4-hydroxy-2H-pyran-2-one of the formula,

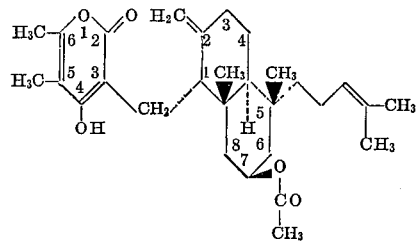

References Cited

Chemical Abstracts, vol. 68, 1968, 39838h relied upon.

DONALD G. DAUS, Primary Examiner

A. M. T. TIGHE, Assistant Examiner

U.S. Cl. X.R.

195—111; 424—279